Patented June 8, 1937

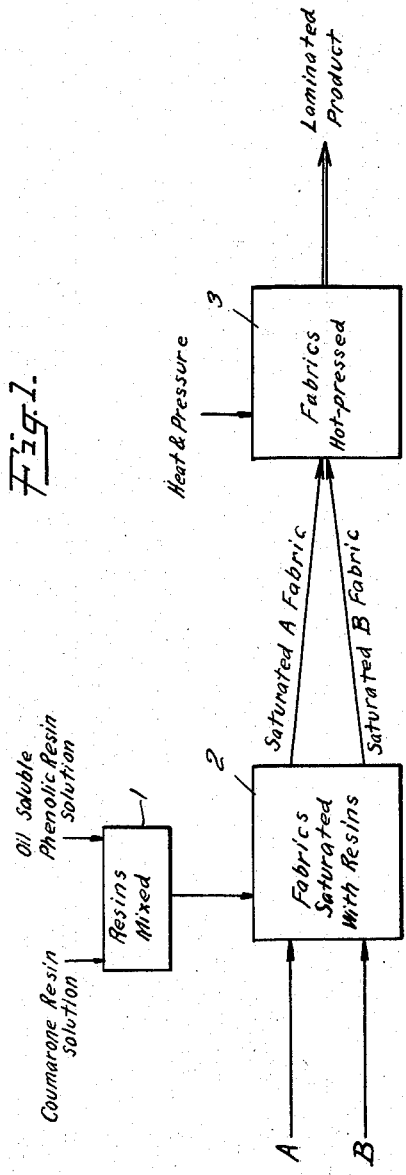
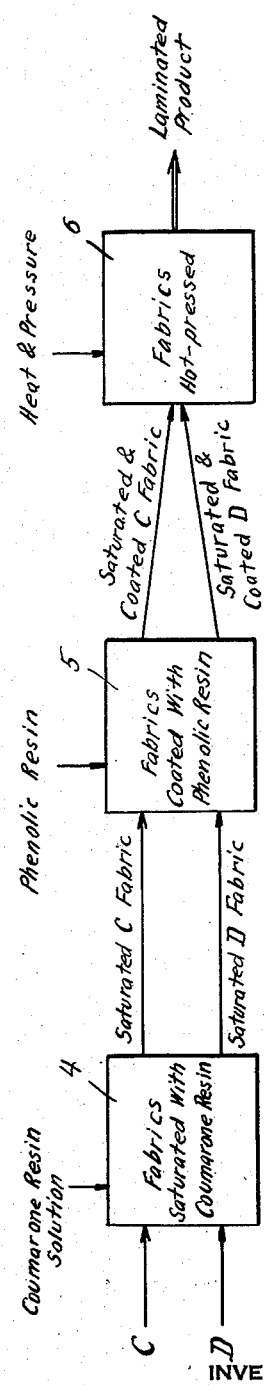

2,082,854

UNITED STATES PATENT OFFICE 2,082,854

LAMINATED PRODUCTS AND METHOD OF MAKING

Leslie Thompson Sutherland, Yonkers, N. Y., assignor to The Barrett Company, New York, N. Y., a corporation of New Jersey Application November 25, 1932, Serial No. 644,319

20 Claims. (Cl. 154—2)

This invention relates to the manufacture of laminated products and is especially directed to a new process for the production of laminated fibrous material employing a coumarone resin as a saturating or impregnating agent.

Although the coumarone resins have been found satisfactory binding agents or saturants where it is desired to produce a laminated structure from open structure sheets such as loosely felted material (e. g. roofing felts or the like), nevertheless, when the lamination of harder fibrous material such as kraft paper, is attempted with these resins, a satisfactory lamination has not been obtained.

In accordance with the present invention the lamination not only of open structure materials, such as felts, but of close structure materials such as kraft paper and other materials which formerly could not be successfully laminated by means of a coumarone resin, is effected by employing in conjunction with the coumarone resin a substantial proportion of a phenolic resin. The products prepared in accordance with the present invention are not readily delaminated as is the case where coumarone resin alone is employed as the binding agent.

By coumarone resin is meant non-saponifiable resinous material produced by the polymerization of the resin-forming constituents of naphthas and similar oils, whether originating in coal or petroleum, and more particularly coumarone resin produced by polymerization (by whatever method) of the resin-forming constituents of solvent naphthas, drip oil, or similar coal distillation products. Such constituents comprise, among others, cyclopentadiene, coumarone, indene, styrol, their homologues and isomers. Commercial coumarone resin usually comprises the polymerization products of a number of such compounds. My invention, however, is not intended to be limited to mixtures but includes the use of the individual polymers, e. g. paracoumarone, as well.

According to my invention an oil-soluble phenolic resin may be added to a light hydrocarbon oil solution of the coumarone resin, and the resulting solution, containing for instance about 1 part of oil-soluble phenolic resin to each 2 parts of coumarone resin, may then be employed for saturating material which it is desired to make up into a laminated structure, for instance, paper, felt, cloth, etc. The desired number of plies of the saturated material may then be superimposed and pressed at a high temperature.

A suitable oil-soluble tar acid resin for this purpose comprises a phenol-formaldehyde resin, containing a drying oil such as China wood oil, linseed oil, rape seed oil, fish oils, etc. Ordinarily the hardening of such a resin takes place less rapidly than that of the simple phenol-formaldehyde resins and consequently it may be desirable to add a small additional quantity of a condensing agent or accelerator such as hexamethylenetetramine.

Instead of mixing the coumarone resin with the tar acid resin prior to saturation of the material to be laminated this material may be saturated with coumarone resin, then coated with a synthetic resin solution and subsequently hot pressed.

In some cases it may be desirable to add a plasticizer. The addition of a plasticizer in suitably regulated amounts does not adversely affect the cohesion of a laminated structure prepared in accordance with the present invention. Examples of plasticizers which may used are the following: tri-cresyl phosphate, butyl phthalate, and butyl stearate.

In order that my invention may be readily understood, reference may be had to the accompanying drawing wherein Fig. 1 shows one method of carrying out my invention, and Fig. 2 shows a second method of carrying out the invention.

With specific reference to Fig. 1, a coumarone resin solution and an oil-soluble phenolic resin are introduced into a mixing tank 1 wherein a suitable solution of these constituents is made up. It may be desirable to add other ingredients to this solution; for instance a condensing agent or accelerator such as hexamethylenetetramine may be added. A suitable saturating solution may be prepared by mixing the following constituents in the designated proportions:

20% coumarone resin (of 110° C. melting point)
   50% solvent (50—50 benzol-toluol)
   30% oil-soluble resin solution which is made of
      6. parts phenol-formaldehyde resin
      1.5 parts China wood oil
      .1 part hexamethylenetetramine
      22.4 parts solvent (50—50 benzol-alcohol)

Another very satisfactory resin solution is as follows:

20% coumarone resin
   40% solvent (50—50 benzol-toluol)
   40% oil-soluble resin solution which is made of
      7.5 parts phenol-formaldehyde resin
      2.5 parts China wood oil
      1. part hexamethylenetetramine
      29.9 parts solvent (50—50 benzol-alcohol)

The material which it is desired to laminate, one sheet of which is designated in the drawing as fabric A and another sheet of which is designated as fabric B, is treated at 2 with the solution obtained in the mixing operation at 1. Fabrics A and B may be of the same or different composition. For instance, sheet A may be of kraft paper and B of other paper or felt, or other material. After the plies have been saturated at 2 by the resin solution, they are superimposed and subjected at 3 to a hot-pressing treatment. This treatment may be carried out by subjecting the material in a suitable press to a pressure of 400 lbs. per square inch at a temperature of 165° C. The hot-pressing is continued until flow of resin is noticeable. Upon removal of the sheets from the press, the product will be found to be a strong laminated structure, the individual sheets of which adhere to each other firmly.

In Fig. 2 I have shown an application of my invention in which sheets are treated first with coumarone resin solution and subsequently with a phenolic resin. Sheets C and D which, as in the preceding example, may be similar or different materials, are treated at 4 with the coumarone resin solution to saturate the fibers with this resin. A suitable solution may be prepared by dissolving coumarone resin in a solution composed of equal parts of benzol and toluol. The proportions may be varied but about 1 part of the resin to 2 parts of the solvent have been found to make a very satisfactory solution. The saturated sheets may be permitted to dry or not as desired and are then coated with a phenolic resin at 5 and, after being coated with the phenolic resin, are brought face to face and subjected to a hot-pressing treatment at 6. A suitable phenolic resin solution for coating the sheets comprises a resin obtained from a mixture of 70% phenols, 24% formaldehyde, and 6% glycerine by weight dissolved in about 3 times its weight of a 50—50 alcohol-benzol solvent.

A laminated structure prepared of kraft paper laminae treated according to this method may contain about 22% coumarone resin and 12% phenol-formaldehyde resin.

Although for simplicity I have shown only two sheets entering into the laminated product, it is obvious that this product may comprise as many layers of the same or different materials as desired.

The pressure employed for the laminating operation may be varied within wide limits as in known processes. The pressure may be 1000-2000 lbs. per square inch, for example, or a higher or lower pressure may be used.

Considerable latitude in the temperature conditions is also possible in carrying out the present invention. The material may be heated during the pressing operation by suitable steam heating means and the steam may advantageously be employed at a pressure of 100 to 125 lbs. per square inch, or other suitable heating means may be employed.

The time necessary for effecting the lamination will vary depending upon the conditions of treatment, and may be as low as 2 or 5 minutes, or, as in the case where a solution containing an oil-soluble synthetic resin is employed without the addition of a condensing agent, considerably longer periods may be necessary. For instance, it may be desirable to continue the hot pressing for a period of up to 30 minutes or more.

If desired other natural or synthetic resins may be used in admixture with a coumarone resin; for instance, oil-soluble tar acid resins or resins obtainable by the condensation of poly-basic acids and polyhydric alcohols such as a phthalic acid anhydride glycerine resin may be employed.

The laminae of compositions prepared in accordance with my invention may be composed of the same or of different materials and they may be saturated with coumarone resins of the same or of different constitution prior to subjecting them to the hot-pressing treatment or one lamina may be saturated with coumarone resin and an adjacent lamina may be saturated with a phenolic resin.

I claim:

1. In the preparation of a laminated structure, embodying a coumarone resin as an impregnating material, by superimposing and compressing a plurality of impregnated laminae, the improvement which comprises providing a binder of the group consisting of oil-soluble phenolic resin and a mixture of said oil-soluble phenolic resin with coumarone resin, and subjecting the superimposed laminae to heat and pressure so as to effect the hardening of the phenolic resin.

2. A laminated structure prepared according to the method of claim 1.

3. The method of producing a laminated structure which comprises saturating a plurality of plies of a fibrous material with a solution comprising a coumarone resin and an oil-soluble phenolic resin, and subjecting the plies to heat and pressure.

4. The method of producing a laminated structure which comprises saturating a fibrous material with a coumarone resin, coating the saturated fabric with an oil-soluble phenolic resin, and subjecting a plurality of plies thereof to heat and pressure.

5. The method of preparing a laminated structure which comprises saturating a plurality of plies of kraft paper with a solution comprising coumarone resin and an oil-soluble phenolic resin, superimposing the plies, and subjecting them to heat and pressure.

6. The method of producing a laminated structure which comprises superimposing a plurality of plies of kraft paper saturated with coumarone resin, coating the saturated paper with an oil-soluble phenol-formaldehyde resin and subjecting to heat and pressure.

7. The method of preparing a laminated structure which comprises saturating a plurality of plies of kraft paper with a solution comprising about 20% of a coumarone resin, about 10% of an oil soluble phenolic resin, about .1% of hexamethylenetetramine and a solvent, superimposing the plies, and subjecting them to heat and pressure.

8. A laminated structure comprising a plurality of plies of fibrous material, a coumarone resin, and having a phenolic resin cured in contact with the coumarone resin, along interfacial surfaces thereof.

9. A laminated structure prepared according to the method of claim 18.

10. A laminated structure prepared according to the method of claim 19.

11. A laminated structure prepared according to the method of claim 3.

12. A laminated structure prepared according to the method of claim 4.

13. A laminated structure prepared according to the method of claim 20.

14. A laminated structure prepared according to the method of claim 5.

15. A laminated structure prepared according to the method of claim 6.

16. A laminated structure prepared according to the method of claim 7.

17. In the preparation of a laminated structure embodying a coumarone resin as an impregnating material, the improvement which comprises providing a binder comprising an oil-soluble phenolic resin on the interfacial surfaces between laminae, and subjecting the superimposed laminae to heat and pressure to effect curing of the phenolic resin.

18. The method of producing a laminated structure which comprises superimposing a plurality of plies of a fibrous material containing a coumarone resin and having a binder comprising an oil-soluble phenolic resin disposed on the interfacial surfaces, and subjecting the superimposed plies to heat and pressure to cure the phenolic resin.

19. The method of laminating a close structure fibrous material which comprises superimposing a plurality of plies of said material saturated with a coumarone resin, and provided with a binder comprising an oil-soluble phenolic resin on the interfacial surfaces, and subjecting to heat and pressure to effect curing of the phenolic resin.

20. The method of preparing a laminated structure which comprises superimposing a plurality of plies of a fibrous material saturated with coumarone resin and having oil-soluble phenol-formaldehyde resin disposed on the interfacial surfaces, and subjecting the plies to heat and pressure to effect curing of the phenol-formaldehyde resin.

LESLIE THOMPSON SUTHERLAND.